US008668857B1

(12) United States Patent
Karem

(10) Patent No.: US 8,668,857 B1
(45) Date of Patent: Mar. 11, 2014

(54) HIGH QUALITY OUT-OF-AUTOCLAVE COMPOSITES

(76) Inventor: Abe Karem, N. Tustin, CA (US)

(*) Notice: Subject to any disclaimer, the term of this patent is extended or adjusted under 35 U.S.C. 154(b) by 782 days.

(21) Appl. No.: 12/426,736

(22) Filed: Apr. 20, 2009

Related U.S. Application Data

(60) Provisional application No. 61/047,877, filed on Apr. 25, 2008.

(51) Int. Cl.
*B29C 45/14* (2006.01)
(52) U.S. Cl.
USPC .......................................... 264/257
(58) Field of Classification Search
USPC .......................................... 264/257
See application file for complete search history.

(56) References Cited

U.S. PATENT DOCUMENTS

| 7,186,367 B2 | 3/2007 | Hou et al. | |
|---|---|---|---|
| 2004/0051214 A1* | 3/2004 | Sheu et al. | 264/511 |
| 2004/0256053 A1* | 12/2004 | Burpo et al. | 156/285 |
| 2005/0253309 A1* | 11/2005 | Hou et al. | 264/571 |

* cited by examiner

*Primary Examiner* — Larry Thrower
(74) *Attorney, Agent, or Firm* — Fish & Associates, PC

(57) ABSTRACT

An aircraft part is manufactured using a process that prepares a laminate portion of the part using an out-of-autoclave resin system and then heat cures the laminate while applying a first vacuum one a first side of the laminate and a second vacuum on a second side of the laminate. This results in a high-quality aircraft part that has low cost and avoids the need for an autoclave. In preferred embodiments, each of the vacuums applied to the laminate has a pressure of less than 30 Torr. The aircraft part resulting from this process can further be advantageously cured at a temperature of at least 180° F. for at least 60 min. Especially preferred methods use the MTM-44 or MTM-45 out-of-autoclave resin systems, which have characteristics that permit the resin to be approved in the primary structure of an aircraft.

10 Claims, 7 Drawing Sheets

US 8,668,857 B1

HIGH QUALITY OUT-OF-AUTOCLAVE COMPOSITES

This application claims priority to U.S. Provisional Application No. 61/047,877, filed Apr. 25, 2008, the disclosure of which is incorporated herein in its entirety.

FIELD OF THE INVENTION

The field of the invention is composite structures.

BACKGROUND

The advantage of using carbon fiber reinforced epoxy or other thermosetting or thermoplastic resins in advanced structures, especially for aircraft, are well known in the industry. In recent years, carbon composite materials have begun to find wide acceptance in aircraft structures. With this new material have come new manufacturing, maintenance and life cycle management processes as well as machines and analysis methods to manufacture these materials.

A composite material consists of fibrous material, usually glass or carbon, embedded in a resin matrix. This matrix is usually a thermosetting or thermoplastic resin. Resins are often pre-impregnated into the fiber in an optimum fiber to resin ratio forming what is termed a pre-preg. In this form, the pre-preg can be stored in a refrigerated environment and will be viscous and tacky with a consistency of cold molasses. Composite structures are made of layers of this pre-preg fabric. During the lamination of several layers, air can become entrapped between adjacent layers leading to small voids in the final cured material that can lead the failure of the material under load.

The most common method of reducing voids in a composite laminate is to use what is termed a vacuum bag. In this process a bag is placed over the finished lamination and the bag is then vented to a vacuum, effectively applying one atmosphere (about 14.7 psi) of pressure to the surface of the laminate, compressing it against the tooling surface. A schematic of this process can be seen in Prior Art FIG. 1. Most high quality resin systems require elevated temperatures to complete the polymerization or curing of the resin. As such, the vacuum bagging process is commonly used in conjunction with an oven that heats the vacuum bagged laminate to cure it.

Typical curing of an aircraft quality composite laminate uses a combination of a vacuum bag to help remove trapped air from the laminate, and an autoclave (a pressurized oven) to decrease the size of trapped air voids in the laminate. This dual system is used to assure higher quality laminates than the vacuum and oven combination alone. A vacuum bag is applied to the laminate after final lamination is complete. In the case of thick laminates, the vacuum can be applied at intervals along the way to decrease the overall volume of trapped air in the laminate. The laminate is then placed in an oven and heated at a time and temperature cycle that usually involves a ramp and hold sequence specific to the resin chemistry. As it is heated, the laminate will soften and the resin will become less viscous. During this window of time, before significant resin polymer cross-linking occurs, the vacuum and the autoclave work in conjunction to remove and compact voids in the lamination. Some amount of void development also occurs as a result of volatile evaporation in the resin during curing. A schematic of this vacuum bag in autoclave process can be seen in Prior Art FIG. 2.

The high pressures involved in the autoclave process (approximately 100 psi) reduce the void content in the laminates and therefore provide long fatigue life airframes for decades of reliable service and tens of thousands of pressurization cycles and flight hours carrying millions of passengers. The manufacture of composite airframes (such as the Boeing 787) in production quantities is substantially dependent on the use of autoclaves which have been in extensive use for the last 4 decades.

The autoclave is a pressure vessel and an oven. As a pressure vessel, the primary cost discriminator for an autoclave is its diameter. An incremental increase in diameter will cost more than an equivalent increase in the length of the autoclave. For large manufacturing operations an autoclave represents a large portion of the manufacturing machines and tooling costs associated with composite manufacturing. Although autoclaves have been produced at diameters up to 30 feet, and lengths nearing 100 feet; for many manufacturers the multi-million dollar investments required to produce autoclave parts this size are prohibitive. Prior Art FIG. 3 illustrates a large autoclave. Wider use of composites has meant an increase in part complexity and size, further pushing up the required sizes of autoclaves. The setup and process time associated with using an autoclave also represents a significant portion of the manufacturing process time of a composite part. Although several resin systems used in conjunction with autoclaves have been approved for use in aircraft primary structure, the cost and schedule impact of a large autoclave is a significant impact on a manufacturing operation.

Void elimination from the vacuum bag/autoclave process is not 100% achievable. One major contributor to this is the evolution of volatiles (and in some cases reaction by-products like water) from the resin during curing. As this evolution is occurring, the resin is cross linking and becoming a solid, reducing the ability to migrate the by-products through the laminate. The composite manufacturer is limited in their process window by the resin chemistry. Simply curing at higher temperatures, or longer cycles with longer intermediate hold profiles does not produce the same end state cured matrix. Over curing of the resin can result in a brittle or weaker resin.

In U.S. Pat. No. 7,186,367 B2 to NASA, a solution to the time-temperature vs. void content limitations in resin curing is proposed. The double vacuum process described in the prior art involves curing the resin under two vacuums. Instead of achieving a surface pressure of one atmosphere in the single vacuum process, the inventor suggests the use of a vacuum both above and below the laminate. This effectively allows the laminate to rest loosely in a vacuum environment. This non-compacted state allows for less restricted egress of volatiles and air voids in the laminate. The resin is heated slowly through ramp up cycle that allows the viscosity to drop while the double vacuum condition exists. As the laminate reaches the hold temperature, where the bulk of resin curing will occur, the vacuum existing above the vacuum bag is allowed to collapse, causing compaction of the laminate through the typical single vacuum process.

A schematic of this process is shown in Prior Art FIG. 4. A composite laminate 12 is on the mold tool 16 with the appropriate perforated peel ply and bleeder cloth 14. Sealing tape 20 is placed on the tool around the laminate with a port venting to vacuum 22 within the boundary of the tape. The first vacuum bag 18 is then placed over the laminate and sealed on the double sealing tape 20. For larger parts the assembly is then placed in a vacuum oven for application of the outer vacuum. For smaller parts, a perforated and rigid housing 34 is then placed over the part and first vacuum bag. A second vacuum bag 26 is placed over the rigid housing and sealed with double sealing tape 30. Within the bounds of this sealing tape and outside the bounds of the first bag is another vacuum port in the mold tool 28. An initial vacuum is then pulled through the first port 22 and second port 28. As the curing cycle ramp levels off to the high temperature hold where cross linking occurs; the second vacuum port 28 is vented to atmosphere, applying ambient pressure the first bag 18.

The recent development of out-of-autoclave resin systems (such as MTM-45™, or Cycom™ 5215) is of great interest to the composite industry. These new resin systems promise to deliver the material properties and void contents of traditional autoclave cured laminates without the time and expense of the autoclave process. Both MTM-44™ (already approved for Airbus™ commercial secondary structures) and MTM-45™ are out-of-autoclave resin systems that compare well with FAA approved autoclave cured resin systems already in use in aircraft primary structure shown by the diamond labeled points. Combining a void decreasing non-autoclave process such as the double vacuum method with an out-of-autoclave resin system will provide the necessary quality increase to create an out-of-autoclave process with sufficient quality to be approved for primary structures.

These out-of-autoclave resin systems are intended to be used in conjunction with a single vacuum bag process and an oven. This represents a significant labor and cost savings with the elimination of the autoclave. However the traditional autoclave process has a long history of processing standardization and material properties databases that are trusted in the aircraft industry. In a necessarily conservative industry, the acceptance of out-of-autoclave resins has been slow and these resin systems have not yet been accepted by military customers and the civilian certification authorities (FAA, JAA, CAA, etc.) for the manufacture of primary aircraft structures. Of primary concern to these oversight authorities are the reliability of the material properties resulting from out-of-autoclave resins. The process sensitivity to time temperature profile variations and vacuum pressures is one such concern.

Prior Art FIG. 5 illustrates the relative glass transition temperature of various resin systems versus their impact strength after compression. Glass transition temperature is a measure of viable operating temperature of a resin before significant reduction in material properties. Compression strength after impact is a measure of damage tolerance of the matrix material.

Thus, there is still a need for improvements in the field, especially with respect to highly stressed thick laminates and/or in manufacturing of complex laminates with highly stressed joints in a co-cured structure.

SUMMARY OF THE INVENTION

The present invention provides apparatus, systems and methods in which an out-of-autoclave resin system is used in conjunction with a double vacuum and oven process.

DETAILED DESCRIPTION

Figure 1:
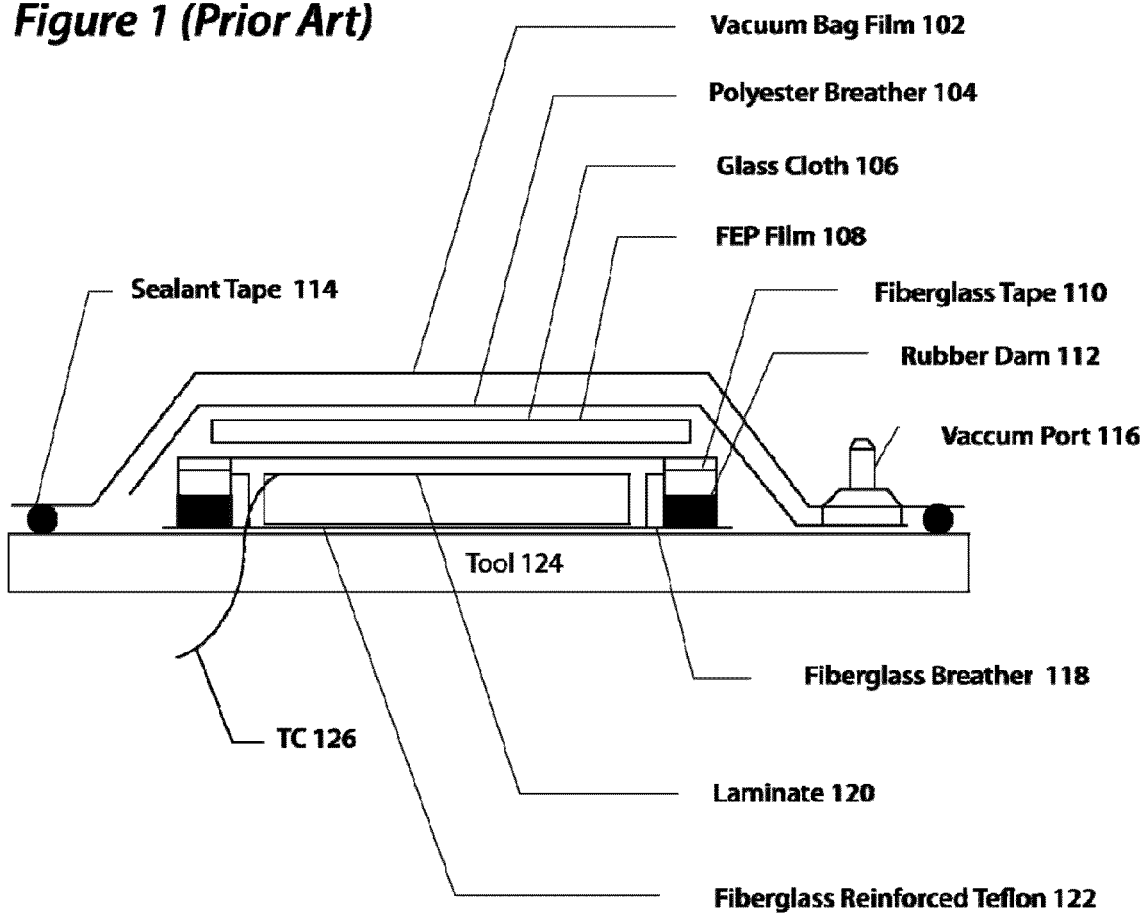
FIG. 1 is a side-view illustration of a prior art vacuum bag apparatus and process for reducing voids in a composite laminate.
Figure 2:
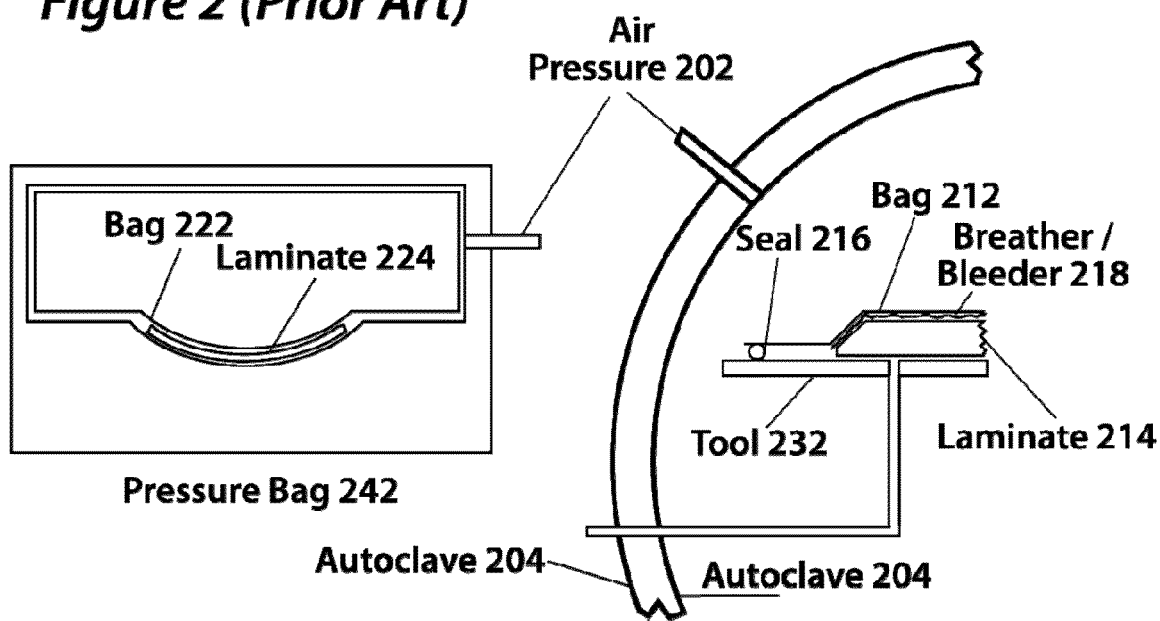
FIG. 2 is a cutaway illustration of a prior art vacuum bag in autoclave process for curing a composite laminate.
Figure 3:
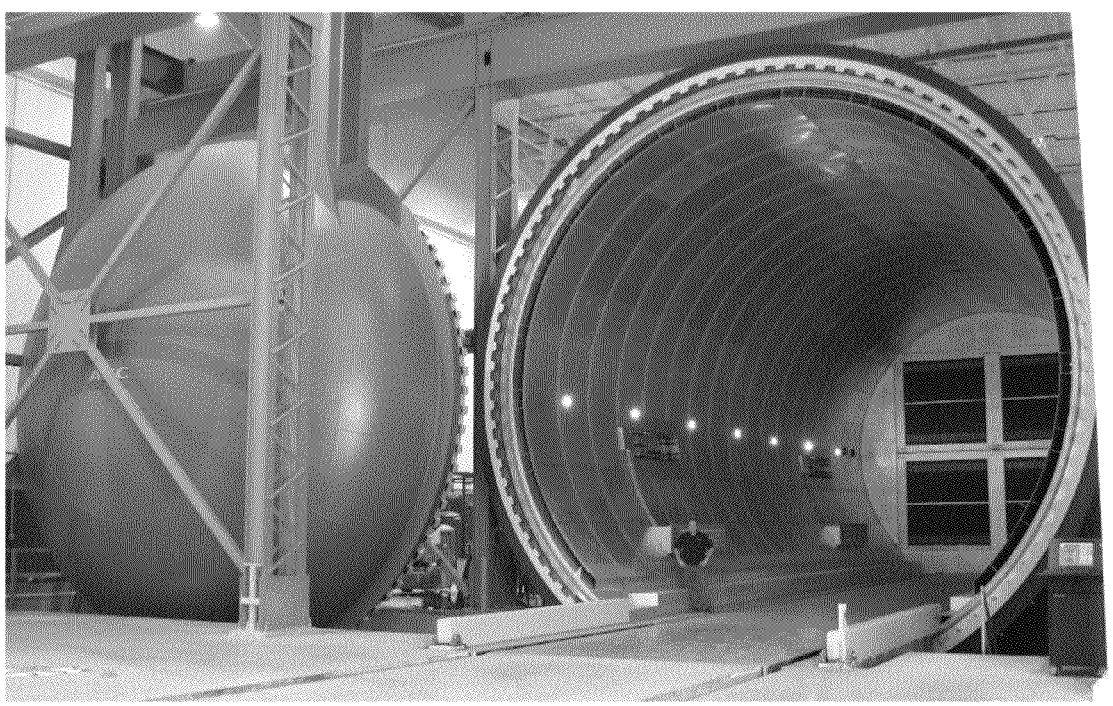
FIG. 3 is a perspective illustration of a prior art large autoclave.
Figure 4:
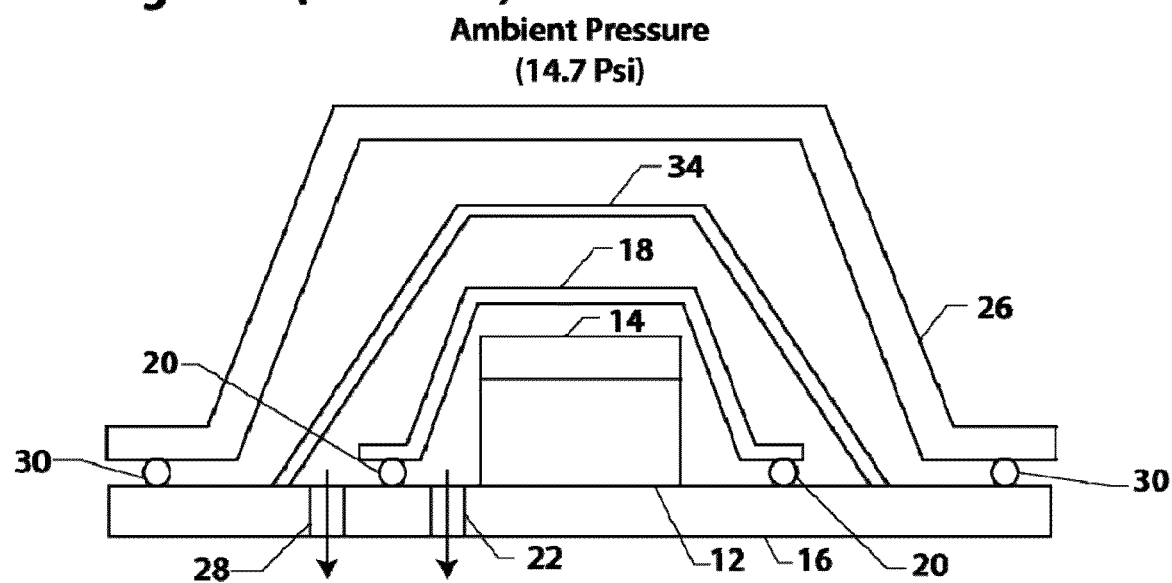
FIG. 4 is a side view illustration of a prior art double vacuum process.
Figure 5:
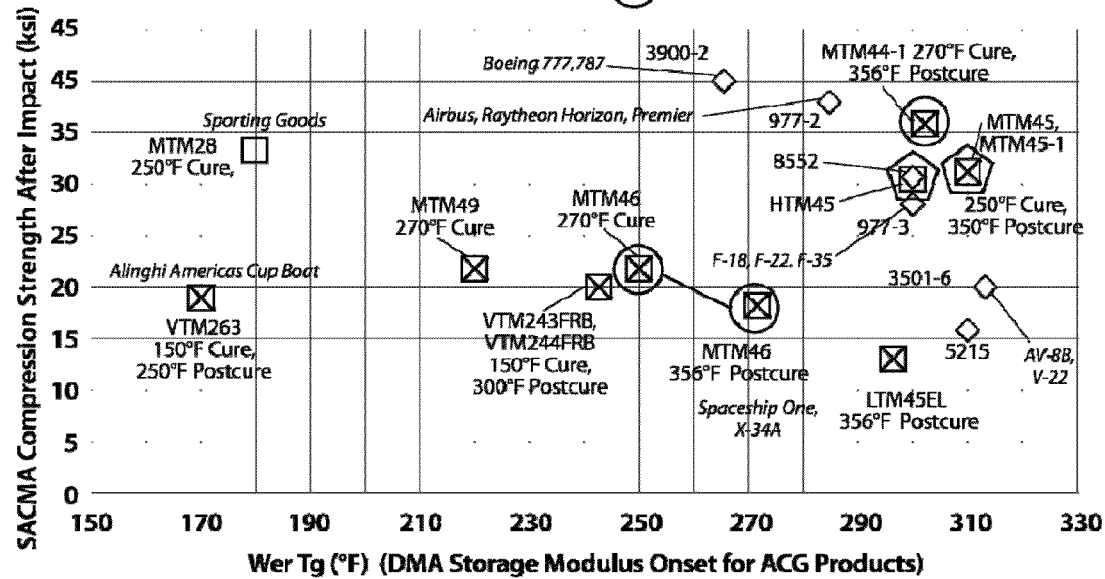
FIG. 5 is a graph of glass transition temperature of various prior art resin systems versus their impact strength after compression.
Figure 6:
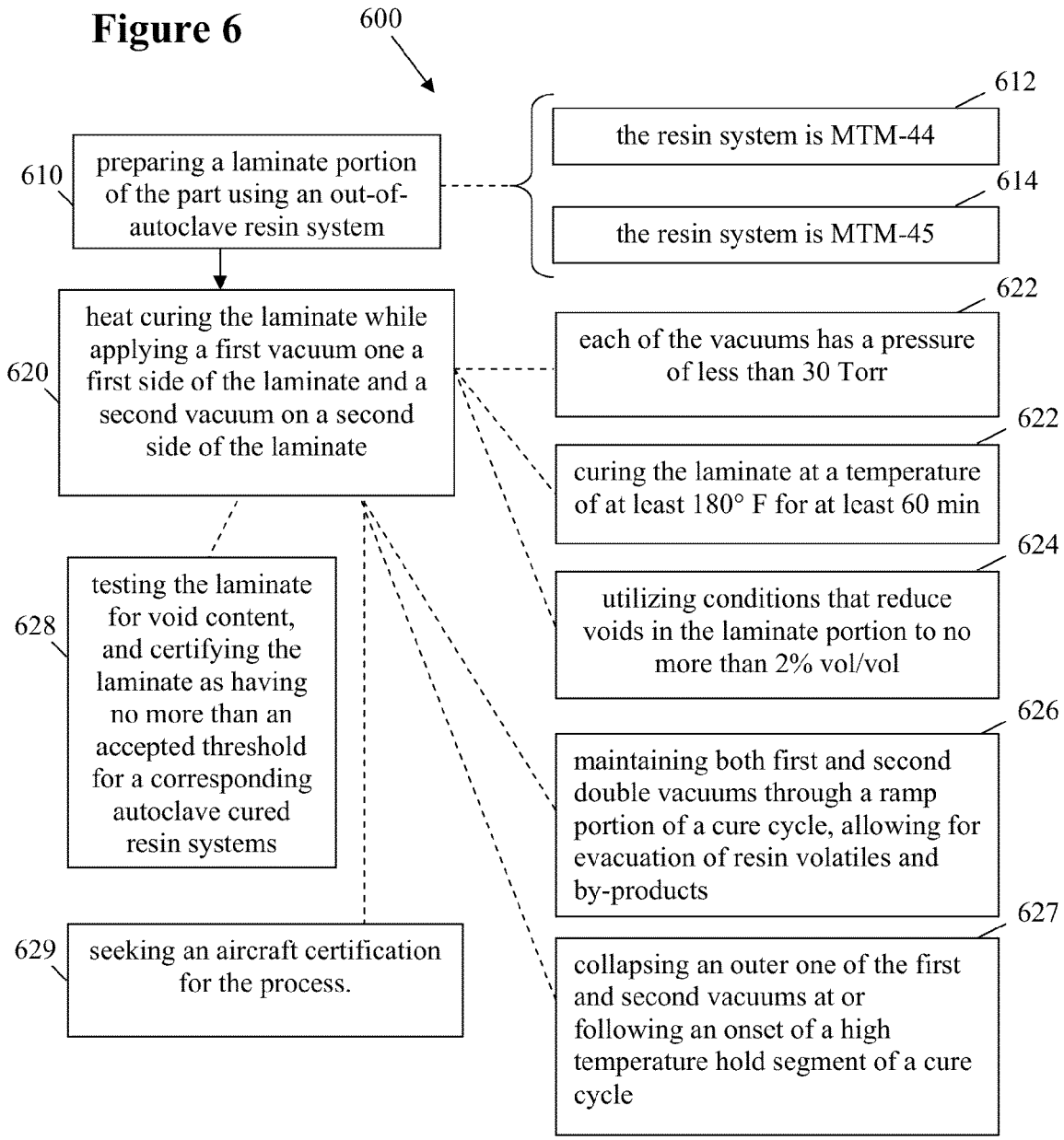
FIG. 6 is a schematic flow chart of a preferred process for producing composite parts, especially for aircraft.

In FIG. 6, a method 600 of manufacturing an aircraft part generally comprises the steps of preparing a laminate portion of the part using an out-of-autoclave resin system 610, and heat curing the laminate while applying a first vacuum one a first side of the laminate and a second vacuum on a second side of the laminate 620.

In especially preferred embodiments, the method includes use of an out-of-autoclave resin system such as MTM-44 as shown in step 612, or MTM-45 as shown in step 614. The use of dashed lines in the figure denotes the fact this is a dependent concept, and the use of the bracket denotes that these are alternatives.

De-bulking and void reduction in the laminate accomplished through implementation of a double vacuum bag process. The laminate is preferably cured through a stepped ramp and hold cure cycle, with the double vacuum being maintained through the ramp portion of the cure cycle, allowing for evacuation of resin volatiles and by-products 626. At the onset of the high temperature hold segment of the cure cycle, the outer vacuum is collapsed, allowing ambient atmospheric pressure to compact the laminate 627.

It is contemplated that the resulting cured laminate can be tested for void content, and certified at or below the threshold of similar autoclave cured resin systems 628. Initial certification of the process 629 can be done through samples and micrographs of the specimens. In production inspection can be done through radiographic or other non-destructive testing.

Use of out-of-autoclave resin systems in conjunction with a double vacuum and oven process will create a more robust manufacturing process. In such a process, structural elements of different cross sections and different fiber directions are laminated together and cured as one assembled structure. The resulting structures are contemplated be especially useful in manufacturing aircraft structures. To that end, one can advantageously seek an aircraft certification for the process and/or parts manufactured by the process 629.

Figure 7:
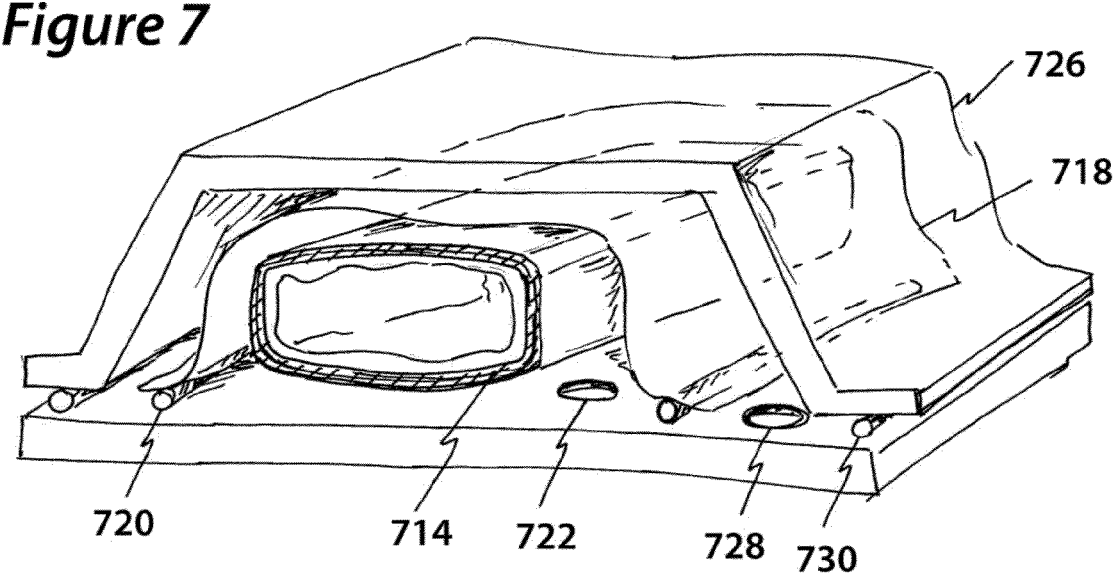
FIG. 7 is a perspective illustration of a preferred aircraft structural spar in a preferred vacuum and curing apparatus.

In FIG. 7, a preferred embodiment of the process is shown. Here an aircraft structural spar 714 has been laminated and vacuum bagged 718. The first vacuum is sealed with tape 720, and the first vacuum is drawn through a port 722. A second vacuum is created by placing a rigid chamber 726 above the first vacuum bag 718, and sealing it with tape 730. A second vacuum is then drawn through a port 728 outside the first vacuum. The proper time and temperature profile is then applied to allow voids to migrate out of the structural spar 714. After a specified cycle hold time, the second vacuum is allowed to collapse, causing the first vacuum bag 718 to be exposed to atmospheric pressure. Under this consolidation pressure, the curing temperature is allowed to increase to the specified maximum where complete resin cross linking can occur. Upon completion of the cure cycle, the first vacuum is collapsed and the part removed. The void content of the resulting structural part will be inspected to obtain approval of the process for aircraft safety verification.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of using an out of autoclave manufacturing resin system to manufacture a hollow part, comprising a process that includes the steps of:
    preparing a laminate portion of the hollow part using the out-of-autoclave resin system, the laminate portion having a lumen defined by a wall;
    bagging the part, and placing the bagged part inside a chamber;
    removing air from the bag to place a first vacuum on both an inner side of the wall and an outer side of the wall;
    removing air from the area between the bag and the chamber to create a second vacuum;
    after a specified cycle hold time, allowing the second vacuum to collapse; and
    applying a curing temperature to the part.

2. The method of claim 1, wherein each of the first and second vacuums has a pressure of less than 30 Torr.

3. The method of claim 2, further comprising curing the laminate at a temperature of at least 180° F. for at least 60 min.

4. The method of claim 1, wherein the out-of-autoclave resin system selected has a compression strength after impact of at least 28 ksi and a Wet Tg of at least 295 degrees Fahrenheit.

5. The method of claim 1, wherein the out-of-autoclave resin system has characteristics that permit the resin to be approved for producing a primary structure of an aircraft.

6. The method of claim 1, wherein the step of heat curing the laminate while applying first and second vacuums comprises utilizing conditions that reduce voids in the laminate portion to no more than 2% vol/vol.

7. The method of claim 1, further comprising maintaining both first and outer vacuums through a ramp portion of a cure cycle, allowing for evacuation of resin volatiles and by-products.

8. The method of claim 1, wherein the step of heat curing the laminate comprises collapsing an outer one of the first and second vacuums at or following an onset of a high temperature hold segment of a cure cycle.

9. The method of claim 1, further comprising testing the laminate for void content, and certifying the laminate as having no more than an accepted threshold for a corresponding autoclave cured resin systems.

10. The method of claim 1, further comprising seeking an aircraft certification for the process.

* * * * *